US012560101B2

(12) United States Patent
Piazza

(10) Patent No.: US 12,560,101 B2
(45) Date of Patent: Feb. 24, 2026

(54) LUBRICATION SYSTEM FOR A TURBINE ENGINE

(71) Applicant: GE Avio S.r.l., Rivalta di Torino (IT)

(72) Inventor: Andrea Piazza, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/751,984

(22) Filed: Jun. 24, 2024

(65) Prior Publication Data

US 2025/0116208 A1    Apr. 10, 2025

(30) Foreign Application Priority Data

Oct. 10, 2023    (IT) ......................... 102023000021018

(51) Int. Cl.
*F01D 25/20* (2006.01)
*F02C 7/32* (2006.01)
(52) U.S. Cl.
CPC ................. *F01D 25/20* (2013.01); *F02C 7/32* (2013.01); *F05D 2220/76* (2013.01)
(58) Field of Classification Search
CPC .......... F01D 25/20; F01D 25/18; F01D 15/10; F01D 15/08; F02C 7/32; F05D 2220/76; F05D 2240/50; F05D 2220/36; F05D 2220/323; F05D 2260/98; B64D 2041/005
USPC ........................................................ 184/6.11
See application file for complete search history.

(56) References Cited

U.S. PATENT DOCUMENTS 2,612,958 A * 10/1952 Richardson ............. B64C 11/42
                                                          60/431
2,974,730 A *  3/1961 Voisard ................. B64C 11/385
                                                          416/46
4,007,892 A *  2/1977 Tabor ..................... B64D 27/00
                                                          60/761

(Continued)

FOREIGN PATENT DOCUMENTS

CN    113202632 A    8/2021
CN    113898526 A    1/2022
(Continued)

OTHER PUBLICATIONS

Van De Ven, "Increasing Hydraulic Energy Storage Capacity: Flywheel-Accumulator," International Journal of Fluid Power 10, No. 3., pp. 41-50 (2009).

*Primary Examiner* — Henry Y Liu
(74) *Attorney, Agent, or Firm* — Venable LLP; Michele V. Frank

(57)    ABSTRACT
A lubrication system for a turbine engine. The turbine engine includes a propulsor and one or more rotating components. The lubrication system includes a sump, a primary lubrication system, an auxiliary lubrication system, and a fuel system. The sump stores lubricant therein. The primary lubrication system supplies the lubricant from the sump to the one or more rotating components during normal operation of the turbine engine. The auxiliary lubrication system includes an auxiliary pump. The fuel system stores hydrogen fuel. The fuel system includes a fuel cell controller that generates electricity from the hydrogen fuel. The electricity powers the auxiliary pump when the propulsor is windmilling such that the auxiliary pump pumps the lubricant from the sump to the one or more rotating components.

20 Claims, 2 Drawing Sheets

(56) References Cited

U.S. PATENT DOCUMENTS

| | | | | |
|---|---|---|---|---|
| 7,205,060 B2 * | 4/2007 | Kaye | H01M 8/04686 | 429/442 |
| 7,513,119 B2 * | 4/2009 | Zielinski | F02C 7/262 | 60/778 |
| 7,597,172 B1 * | 10/2009 | Kovach | F16H 47/02 | 180/305 |
| 7,621,117 B2 * | 11/2009 | Dooley | F01D 19/00 | 60/793 |
| 7,662,059 B2 * | 2/2010 | McCune | F01D 25/20 | 184/6.12 |
| 7,834,471 B2 * | 11/2010 | Cripps | F03G 1/026 | 290/1 R |
| 7,849,668 B2 * | 12/2010 | Sheridan | F01D 25/20 | 384/473 |
| 7,878,302 B2 * | 2/2011 | Smith | F16N 17/02 | 184/6.11 |
| 7,883,438 B2 | 2/2011 | McCune | | |
| 7,892,690 B2 * | 2/2011 | Kaye | H01M 8/04388 | 429/492 |
| 8,191,686 B2 * | 6/2012 | Galivel | F01M 9/04 | 60/39.08 |
| 8,230,974 B2 * | 7/2012 | Parnin | F01D 25/18 | 184/6.11 |
| 9,840,969 B2 * | 12/2017 | Sheridan | F16H 1/48 | |
| 9,903,227 B2 * | 2/2018 | Cigal | F01D 25/18 | |
| 10,107,135 B2 * | 10/2018 | Schwarz | F02C 3/04 | |
| 10,145,276 B2 * | 12/2018 | Parnin | F01M 11/10 | |
| 10,208,624 B2 * | 2/2019 | Duong | F02C 3/107 | |
| 10,221,770 B2 * | 3/2019 | Sheridan | F02C 7/06 | |
| 10,240,477 B2 * | 3/2019 | Ettridge | F01D 15/10 | |
| 10,267,233 B2 * | 4/2019 | Mastro | F02C 3/107 | |
| 10,364,150 B2 * | 7/2019 | Finnerty | B01J 12/005 | |
| 10,513,949 B2 * | 12/2019 | Parnin | F16H 57/0442 | |
| 10,634,053 B2 * | 4/2020 | Schwarz | F16H 57/0471 | |
| 10,801,413 B2 * | 10/2020 | Roberge | F02C 6/14 | |
| 10,837,312 B2 * | 11/2020 | Gates | F01D 5/06 | |
| 10,968,825 B2 * | 4/2021 | Mackin | F02C 3/305 | |
| 11,092,037 B2 * | 8/2021 | Valva | F01M 1/02 | |
| 11,125,111 B2 * | 9/2021 | Mason | F01D 25/20 | |
| 11,125,167 B2 | 9/2021 | Sheridan | | |
| 11,174,797 B2 * | 11/2021 | Gebhard | F02C 7/36 | |
| 11,254,568 B2 * | 2/2022 | Finnerty | H01M 8/0631 | |
| 11,261,755 B2 * | 3/2022 | Cornet | F02C 7/06 | |
| 11,428,163 B2 * | 8/2022 | Parnin | F01D 17/20 | |
| 11,511,872 B2 * | 11/2022 | Staubach | B64D 27/355 | |
| 11,732,652 B2 * | 8/2023 | Sibbach | F02C 7/22 | 60/736 |
| 11,909,079 B2 * | 2/2024 | Morrison | H01M 8/04597 | |
| 12,202,616 B2 * | 1/2025 | Wang | B64D 31/06 | |
| 2006/0029848 A1 * | 2/2006 | Kaye | H01M 8/04432 | 429/442 |
| 2006/0168968 A1 * | 8/2006 | Zielinski | F02C 7/262 | 60/778 |
| 2007/0160879 A1 * | 7/2007 | Kaye | H01M 8/04432 | 429/506 |
| 2007/0289310 A1 * | 12/2007 | Dooley | F01D 15/10 | 60/773 |
| 2010/0018194 A1 * | 1/2010 | Kovach | F16H 47/02 | 60/435 |
| 2012/0221157 A1 * | 8/2012 | Finney | F02C 7/32 | 700/287 |
| 2013/0076120 A1 * | 3/2013 | Wagner | F01D 15/10 | 307/9.1 |
| 2013/0319006 A1 * | 12/2013 | Parnin | F02C 3/107 | 184/6.12 |
| 2013/0320136 A1 * | 12/2013 | Zhou | H01M 8/04298 | 429/417 |
| 2016/0123174 A1 * | 5/2016 | Ettridge | F01D 5/06 | 290/46 |
| 2016/0215652 A1 * | 7/2016 | Mastro | F16H 57/0441 | |
| 2016/0280540 A1 * | 9/2016 | Finnerty | B01J 8/24 | |
| 2018/0138526 A1 * | 5/2018 | Uozumi | H01M 8/04022 | |
| 2019/0186373 A1 * | 6/2019 | Lowery | F02C 7/222 | |
| 2019/0323426 A1 * | 10/2019 | Mackin | B64D 31/18 | |
| 2019/0323427 A1 * | 10/2019 | Mackin | F04D 25/06 | |
| 2020/0149430 A1 * | 5/2020 | Cornet | F02C 7/06 | |
| 2020/0299131 A1 * | 9/2020 | Finnerty | H01M 8/0625 | |
| 2021/0156380 A1 * | 5/2021 | Kataoka | H02K 7/14 | |
| 2021/0179286 A1 * | 6/2021 | Harvey | B64D 27/10 | |
| 2021/0257891 A1 * | 8/2021 | Guardiola | H02K 7/083 | |
| 2022/0052361 A1 * | 2/2022 | Morrison | H01M 8/04014 | |
| 2022/0267021 A1 * | 8/2022 | Zebian | F02C 7/14 | |
| 2022/0399556 A1 * | 12/2022 | Ito | H01M 8/04902 | |
| 2023/0008605 A1 * | 1/2023 | Bellis | F02C 9/28 | |
| 2023/0138892 A1 * | 5/2023 | Wang | H01M 8/0494 | 60/773 |

FOREIGN PATENT DOCUMENTS

| | | | |
|---|---|---|---|
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |
| WO | 92/22747 A1 | 12/1992 |

* cited by examiner

LUBRICATION SYSTEM FOR A TURBINE ENGINE

CROSS REFERENCE TO RELATED APPLICATIONS

The present application claims the benefit of Italian Patent Application No. 102023000021018, filed on Oct. 10, 2023, which is hereby incorporated by reference herein in its entirety.

TECHNICAL FIELD

The present disclosure relates generally to a lubrication system, for example, for a turbine engine.

BACKGROUND

Turbine engines generally include a propulsor (e.g., a fan) and a core section arranged in flow communication with one another. Some turbine engines include a one or more rotating components that rotate. A lubrication system provides a lubricant to the one or more rotating components of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
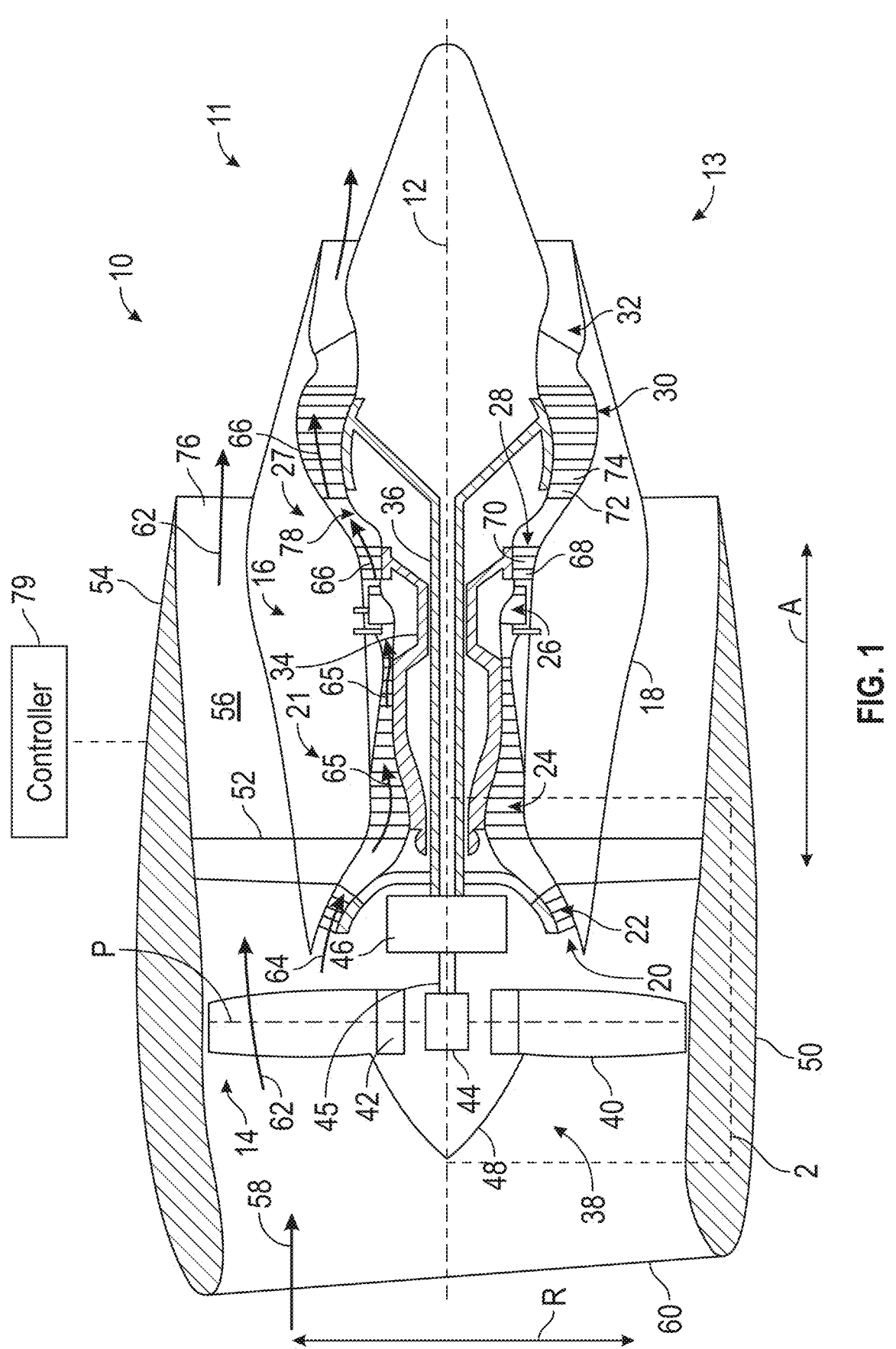
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "propulsor" is a component of the turbine engine that is drivingly coupled to the core turbine engine such that rotation of the components of the core turbine engine causes the propulsor to rotate and to generate thrust. A propulsor can include a fan or a propeller. In turbofan engines or open fan engines, the propulsor is a fan. In turboprop engines, the propulsor is a propeller.

As used herein, "normal operation" of a turbine engine is intended to mean when the turbine engine is operating, and a primary lubrication system of the turbine engine is supplying lubricant to one or more rotating components of the turbine engine. Normal operation can include a mission cycle of the turbine engine after the turbine engine is powered on, including, for example, idle conditions, taxiing conditions, takeoff conditions, cruise conditions, descent conditions, or landing conditions.

As used herein, "windmill" or "windmilling" is a condition when the propulsor and the low-pressure shaft of the turbine engine continue to rotate at low speeds, while the high-pressure shaft rotates slowly or even stops. Windmilling can occur when the turbine engine is shut down, but air still flows across the propulsor, such as during an in-flight engine shutdown or when the turbine engine is on the ground and the propulsor is rotating in the presence of wind when the turbine engine is shutdown. During a shutdown, e.g., while the aircraft is on the ground, the propulsor may also rotate in either direction depending upon the stationary position of the turbine engine relative to the ambient wind. Airflow entering the propulsor exhaust may exit the propulsor inlet in an opposite direction as a direction of operation and cause the propulsor to rotate in an opposite rotational direction compared to the intended operational rotational direction.

As used herein, "active," "activate" or "activating" an auxiliary lubrication system includes causing lubricant to flow within the auxiliary lubrication system. For example, activating the auxiliary lubrication system includes powering an auxiliary pump to pump the lubricant through the auxiliary lubrication system.

As used herein, to "inactivate" an auxiliary lubrication system or an "inactive" auxiliary lubrication system includes preventing the lubricant from flowing within the auxiliary lubrication system. For example, when the auxiliary lubrication system is inactive, the auxiliary pump is powered off and is prevented from pumping the lubricant through the auxiliary lubrication.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components or the systems or manufacturing the components or the systems. For example, the approximating language may refer to being within a one, a two, a four, a ten, a fifteen, or a twenty percent margin in either individual values, range(s) of values or endpoints defining range(s) of values.

The present disclosure provides for a turbine engine having a lubrication system. The turbine engine includes a propulsor having a propulsor shaft. The turbine engine includes one or more rotating components that rotate within the turbine engine. The one or more rotating components can include, for example, one or more shafts, one or more gears, one or more bearings including one or more engine bearings for the one or more shafts of the turbine engine (e.g., a low-pressure shaft or a high-pressure shaft) or one or more power gearbox bearings for a power gearbox assembly of the turbine engine). The one or more power gearbox bearings allow rotation of one or more power gearbox gears of the power gearbox assembly about the one or more power gearbox bearings. In one embodiment, one or more of the bearings are journal bearings. The one or more bearings can include any type of bearings, such as, for example, roller bearings, or the like. The lubrication system supplies a lubricant (e.g., oil) to the one or more rotating components. The lubrication system includes a sump that stores lubricant therein, and a primary lubrication system having a primary pump and a primary lubricant supply line. During normal operation of the turbine engine, the primary pump pumps the lubricant from the sump to the one or more rotating components through the primary lubricant supply line.

The bearings, especially, journal bearings, are hydrodynamic bearings that typically require a steady supply of lubricant during all operational phases of the turbine engine to properly lubricate the bearings to prevent damage due to sliding contact for hydrodynamic journal bearings or even for the generic gear mesh interface. The shafts of the turbine engine may experience long duration, continued rotation following a shutdown of the turbine engine, such as that occurring during windmilling. In such instances, the one or more rotating components, and, in particular, the one or more bearings, can be affected by not receiving enough lubricant for lubricating the one or more rotating components. For example, during windmilling, the rotational speed of the shafts may be too low to power the primary pump to pump the lubricant to the one or more rotating components. In some instances, e.g., during operation of the turbine engine (e.g., in-flight), the lubrication system may lose pressure (e.g., due to a failure of the primary pump or other components of the primary lubrication system), such that the primary lubrication system is unable to provide the lubricant to the one or more rotating components via the primary pump and the primary lubricant supply line.

The criticality of the lubricant interruptions increases when the bearings are journal bearings, since the absence of lubricant at the journal bearings can lead to a journal bearing failure and subsequent gearbox failure, which may cause the low-speed shaft to lock up permanently. Such a failure of the journal bearings is referred to as a journal bearing seizure and occurs when there is contact between the planet pin and the bore of the gear, thereby causing a significant increase of wear and friction that leads to bearing failure. If contact occurs between the journal bearing and the pin during high-power operation, the two components can become welded together due to the high temperature from the friction.

Some turbine engines include an auxiliary lubrication system that includes an auxiliary pump to supply lubricant to the one or more rotating components to prevent damage to the rotating components due to inadequate lubricant supply during windmilling. Further, the auxiliary pump requires added complexity to provide the lubricant during high speeds, such as during operation of the turbine engine, and during low speeds, such as during windmilling (e.g., in-flight or on the ground). Such auxiliary pumps may be drivingly coupled to the propulsor shaft and requires added complexity for driving the auxiliary pump by the propulsor shaft. Further, the auxiliary pump requires added complexity to provide the lubricant while the propulsor windmills in either direction (e.g., the propulsor rotates clockwise or counterclockwise).

Accordingly, the present disclosure provides an auxiliary lubrication system that supplies the lubricant to the one or more rotating components during any time that the primary lubrication system is unable to supply the lubricant. In particular, the present disclosure provides for supplying lubricant to the one or more rotating components (e.g., journal bearings) when the turbine engine is shut down or whenever the turbine engine is windmilling to avoid journal bearing seizure. The present disclosure provides a fuel cell that converts chemical energy of gaseous hydrogen fuel into electricity. In this way, the fuel cell generates voltage for operating an electrical auxiliary lubricant pump that can be used for feeding the lubricant to the one or more rotating components, in particular, to the journal bearings. In this way, the fuel cell powers the electrical auxiliary lubricant pump such that electrical auxiliary lubricant pump supplies lubricant to the one or more rotating components whenever the shafts of the turbine engine are rotating at a low rotational speed (e.g., below a rotational speed threshold) and cannot power the primary pump to supply the lubricant to the one or more rotating components.

Accordingly, the auxiliary lubrication system supplies lubricant to the one or more rotating components while the turbine engine is shut down or is otherwise windmilling. The fuel system of the present disclosure ensures that the auxiliary pump operates to pump the lubricant to the one or more rotating components independently of the rotational direction of the propulsor during windmilling (e.g., whether the propulsor is rotating clockwise or counterclockwise).

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In the orientation of FIG. 1, portions of the turbine engine 10 above the longitudinal centerline axis 12 are referred to as a top portion 11 and portions of the turbine engine 10 below the longitudinal centerline axis 12 are referred to as a bottom portion 13. In general, the turbine engine 10 includes a propulsor section 14 and a core turbine engine 16 disposed downstream from the propulsor section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or a spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The HP shaft 34, the LP shaft 36, or both the HP shaft 34 and the LP shaft 36 are supported by one or more engine bearings that allow the HP shaft 34 or the LP shaft 36 to rotate, as detailed further below. The compressor section 21, the combustion section 26, the turbine section 27, and the jet exhaust nozzle section 32 together define a core air flow path.

For the embodiment depicted in FIG. 1, the propulsor section 14 includes a propulsor 38 (e.g., a variable pitch propulsor) having a plurality of propulsor blades 40 coupled to a disk 42 in a spaced apart manner. In the embodiment of FIG. 1, the propulsor 38 is a fan that is driven by the core turbine engine 16. In some embodiments, the propulsor 38 is a propeller that is driven by the core turbine engine 16. The propulsor blades 40 extend outwardly from the disk 42 generally along the radial direction R. Each propulsor blade 40 is rotatable relative to the disk 42 about a pitch axis P by virtue of the propulsor blades 40 being operatively coupled to an actuation member 44 configured to collectively vary the pitch of the propulsor blades 40 in unison, as detailed further below. The propulsor blades 40, the disk 42, and the actuation member 44 are together rotatable about the longitudinal centerline axis 12 via a propulsor shaft 45 that is powered by the LP shaft 36 across a power gearbox, also referred to as a power gearbox assembly 46. The power gearbox assembly 46 is shown schematically in FIG. 1. The power gearbox assembly 46 includes a plurality of power gearbox gears for adjusting the rotational speed of the propulsor shaft 45 and, thus, the propulsor 38 relative to the LP shaft 36. The power gearbox assembly 46 also includes one or more power gearbox bearings for supporting rotation of one or more of the plurality of power gearbox gears, as detailed further below.

Referring still to the exemplary embodiment of FIG. 1, the disk 42 is covered by a propulsor hub 48 that is aerodynamically contoured to promote an airflow through the plurality of propulsor blades 40. In addition, the propulsor section 14 includes an annular propulsor casing or a nacelle 50 that circumferentially surrounds the propulsor 38 and at least a portion of the core turbine engine 16. The nacelle 50 is supported relative to the core turbine engine 16 by a plurality of outlet guide vanes 52 that is circumferentially spaced about the nacelle 50 and the core turbine engine 16. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 or the propulsor section 14. As the volume of the air 58 passes across the propulsor blades 40, a first portion of air, referred to as bypass air 62, is directed or is routed into the bypass airflow passage 56, and a second portion of air, referred to as core air 64, is directed or is routed into the upstream section of the core air flow path, or, more specifically, into the annular inlet 20 of the LP compressor 22. The ratio between the bypass air 62 and the core air 64 is commonly known as a bypass ratio. The pressure of the core air 64 is then increased, generating compressed air 65, and the compressed air 65 is routed through the HP compressor 24 and into the combustion section 26, where the compressed air 65 is mixed with fuel and burned to generate combustion gases 66.

The combustion gases 66 are routed into the HP turbine 28 and expanded through the HP turbine 28 where a portion of thermal energy or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of the thermal energy or kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the propulsor 38 via the power gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a propulsor nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

A controller 79 is in communication with the turbine engine 10 for controlling aspects of the turbine engine 10. For example, the controller 79 is in two-way communication with the turbine engine 10 for receiving signals from various sensors and control systems of the turbine engine 10, and for controlling components of the turbine engine 10, as detailed further below. The controller 79, or components thereof, may be located onboard the turbine engine 10, onboard the aircraft (not shown), or can be located remote from each of the turbine engine 10 and the aircraft. The controller 79 can be a Full Authority Digital Engine Control (FADEC) that controls aspects of the turbine engine 10.

The controller 79 may be a standalone controller or may be part of an engine controller to operate various systems of the turbine engine 10. In this embodiment, the controller 79 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 79 to perform operations. The controller 79 and, more specifically, the one or more processors are programmed or configured to perform these operations, such as the operations discussed further below. In some embodiments, the instructions can be executed by the one or more processors to cause the one or more processors to complete any of the operations and functions for which the controller 79 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a wide variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The turbine engine 10 depicted in FIG. 1 is by way of example only. In other exemplary embodiments, the turbine engine 10 may have any other suitable configuration. For example, in other exemplary embodiments, the propulsor 38 may be configured in any other suitable manner (e.g., as a fixed pitch propulsor) and further may be supported using any other suitable propulsor frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
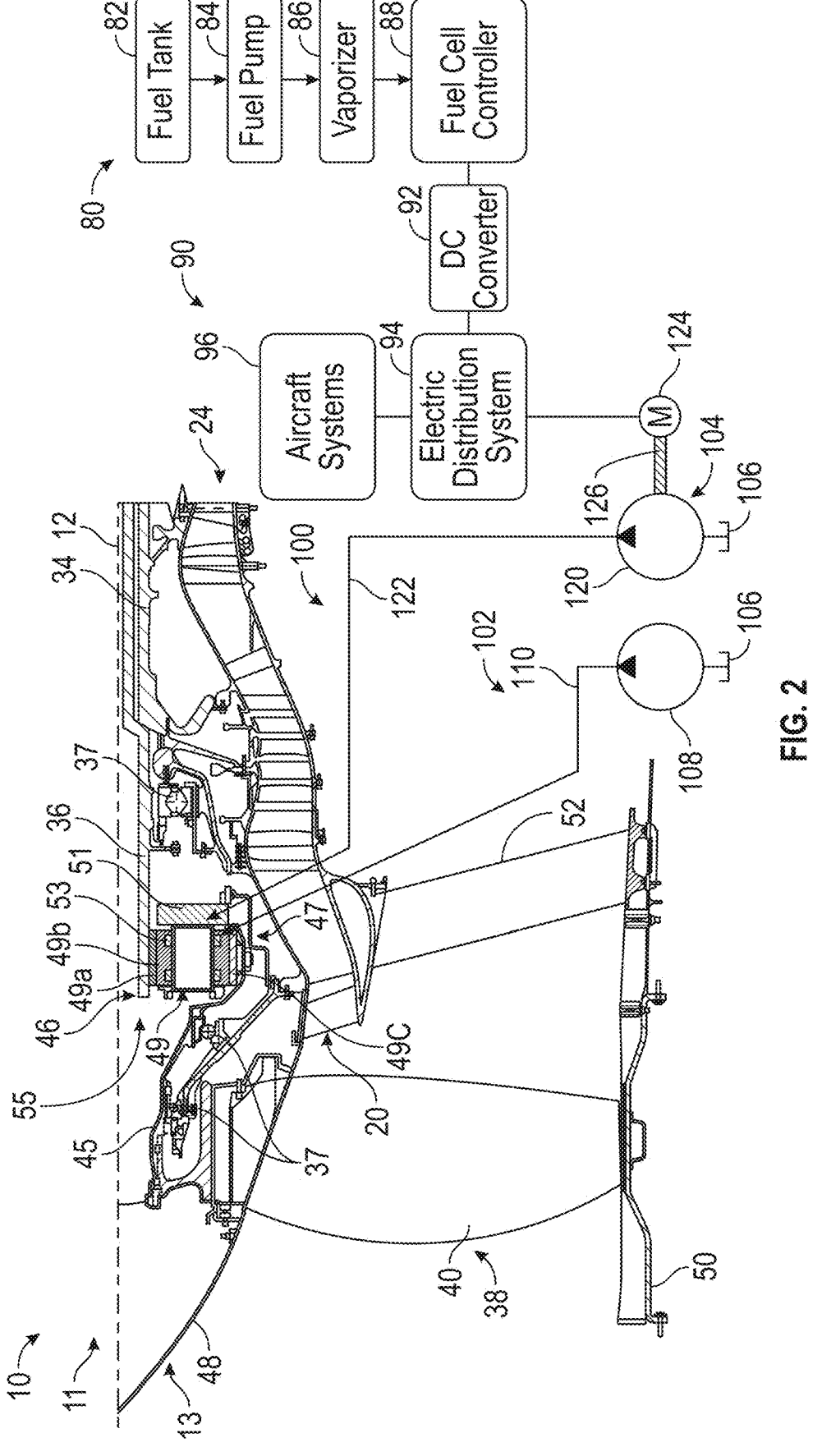
FIG. 2 is a detailed schematic cross-sectional view of a portion of the turbine engine of FIG. 1, taken at detail 2 in FIG. 1, according to the present disclosure.

FIG. 2 is a detailed schematic cross-sectional view of a portion of the turbine engine 10, taken at detail 2 in FIG. 1, according to the present disclosure. As shown in FIG. 2, the turbine engine 10 includes one or more engine bearings 37 that support rotation of the LP shaft 36 and the propulsor shaft 45. The one or more engine bearings 37 can also support rotation of the HP shaft 34. The one or more engine bearings 37 can include any number of engine bearings 37 for supporting rotation of the shafts of the turbine engine 10. The one or more engine bearings 37 are referred to as rotating components of the turbine engine 10, and can include any type of bearing, such as, for example, journal bearings, roller bearings, or the like.

The power gearbox assembly 46 includes a power gearbox gear assembly 47 having a plurality of power gearbox gears 49. The plurality of power gearbox gears 49 includes a first power gearbox gear 49a, one or more second power gearbox gears 49b secured by a planet carrier 51, and a third power gearbox gear 49c. In FIG. 2, the first power gearbox gear 49a is a sun gear, the one or more second power gearbox gears 49b are planet gears, and the third power gearbox gear 49c is a ring gear. The power gearbox gear assembly 47 can be an epicyclic gear assembly. When the power gearbox gear assembly 47 is an epicyclic gear assembly, the one or more second power gearbox gears 49b include a plurality of second power gearbox gears 49b (e.g., two or more second power gearbox gears 49b).

In the epicyclic gear assembly, the power gearbox gear assembly 47 can be in a star arrangement or a rotating ring gear type gear assembly (e.g., the third power gearbox gear 49c is rotating and the planet carrier 51 is fixed and stationary). In such an arrangement, the propulsor 38 is driven by the third power gearbox gear 49c. For example, the third power gearbox gear 49c is coupled to the propulsor shaft 45 such that rotation of the third power gearbox gear 49c causes the propulsor shaft 45, and, thus, the propulsor 38, to rotate. In this way, the third power gearbox gear 49c is an output of the power gearbox gear assembly 47. However, other suitable types of gear assemblies may be employed. In one non-limiting embodiment, the power gearbox gear assembly 47 is a planetary arrangement, in which the third power gearbox gear 49c is held fixed, with the planet carrier 51 allowed to rotate. In such an arrangement, the propulsor 38 is driven by the planet carrier 51. For example, the planet carrier 51 is coupled to the propulsor shaft 45 such that rotation of the planet carrier 51 causes the propulsor shaft 45, and, thus, the propulsor 38, to rotate. In this way, the one or more second power gearbox gears 49b (e.g., via the planet carrier 51) are the output of the power gearbox gear assembly 47. In another non-limiting embodiment, the power gearbox gear assembly 47 may be a differential gear assembly in which the third power gearbox gear 49c and the planet carrier 51 are both allowed to rotate. While an epicyclic gear assembly is detailed herein, the power gearbox gear assembly can include any type of gear assembly including, for example, a compound gear assembly, a multiple stage gear assembly, or the like.

The plurality of power gearbox gears 49 includes one or more power gearbox bearings 53 disposed therein. For example, the one or more second power gearbox gears 49b each includes one or more power gearbox bearings 53 disposed therein. The one or more power gearbox bearings 53 enable the plurality of power gearbox gears 49 to rotate about the one or more power gearbox bearings 53 such that the plurality of power gearbox gears 49 rotates. The one or more power gearbox bearings 53 can include any type of bearing for a gear, such as, for example, journal bearings, roller bearings, or the like. The plurality of power gearbox gears 49 and the one or more power gearbox bearings 53 are rotating components of the turbine engine 10. Accordingly, the turbine engine 10 includes one or more rotating components 55 that includes at least one of the one or more engine bearings 37, the plurality of power gearbox gears 49, or the one or more power gearbox bearings 53. The one or more rotating components 55 can also include the HP shaft 34 or the LP shaft 36.

The first power gearbox gear 49a is coupled to an input shaft of the turbine engine 10. For example, the first power gearbox gear 49a is coupled to the LP shaft 36 such that rotation of the LP shaft 36 causes the first power gearbox gear 49a to rotate. Radially outward of the first power gearbox gear 49a, and intermeshing therewith, is the one or more second power gearbox gears 49b that are coupled together and supported by the planet carrier 51. The planet carrier 51 supports and constrains the one or more second power gearbox gears 49b such that each of the one or more second power gearbox gears 49b is enabled to rotate about a corresponding axis of each second power gearbox gear 49b without rotating about the periphery of the first power gearbox gear 49a. Radially outwardly of the one or more second power gearbox gears 49b, and intermeshing therewith, is the third power gearbox gear 49c, which is an annular ring gear. The third power gearbox gear 49c is coupled via an output shaft to the propulsor 38 and rotates to drive rotation of the propulsor 38 about the longitudinal centerline axis 12. For example, the propulsor shaft 45 is coupled to the third power gearbox gear 49c.

The turbine engine 10 includes a fuel system 80 for generating electricity. The fuel system 80 includes a fuel tank 82 for storing fuel therein, a fuel pump 84, a vaporizer 86, and a fuel cell controller 88. The fuel tank 82 can be located on an aircraft (not shown) to which the turbine engine 10 is attached. While a single fuel tank 82 is shown in FIG. 1, the fuel system 80 can include any number of fuel tanks 82, as desired. The fuel system 80 includes one or more lines, conduits, pipes, tubes, etc., configured to carry the fuel from the fuel tank 82 to the fuel cell controller 88. The fuel pump 84 induces the flow of the fuel through the fuel system 80 to the fuel cell controller 88. In this way, the fuel pump 84 pumps the fuel from the fuel tank 82, through the fuel system 80, and into the fuel cell controller 88. In some embodiments, the fuel system 80 supplies the fuel to the combustion section 26 (FIG. 1) to be combusted for generating thrust for the turbine engine 10.

In FIG. 2, the fuel is a hydrogen fuel that is stored in the fuel tank 82 as liquid hydrogen fuel. The vaporizer 86 heats the liquid hydrogen fuel flowing through the fuel system 80. The vaporizer 86 is positioned in the flow path of the fuel between the fuel tank 82 and the fuel cell controller 88, and is located downstream of the fuel pump 84. While one vaporizer 86 is shown in FIG. 2, the fuel system 80 can include any number of vaporizers 86, as desired. The vaporizer 86 is in thermal communication with at least one heat source, such as, for example, waste heat from the turbine engine 10 or from one or more aircraft systems 96 of the aircraft. The vaporizer 86 heats the liquid hydrogen fuel and the liquid hydrogen fuel is converted into a gaseous hydrogen fuel within the vaporizer 86. The fuel system 80 directs the gaseous hydrogen fuel into the fuel cell controller 88. The fuel cell controller 88 includes a fuel cell that converts chemical energy of the fuel (e.g., the gaseous hydrogen fuel) and an oxidizing agent (e.g., oxygen) into electricity through a pair of redox reactions. In this way, the fuel cell controller 88 receives the gaseous hydrogen fuel and the oxidizing agent and generates electricity. The fuel cell controller 88 outputs the electricity to an electrical system 90. In some embodiments, the fuel system 80 supplies the gaseous hydrogen fuel for providing auxiliary power for the turbine engine 10. In some embodiments, the fuel system 80 supplies the gaseous hydrogen fuel to the combustion section 26 (FIG. 1) for combusting the gaseous hydrogen fuel and generating thrust for the turbine engine 10.

The electrical system 90 includes a direct current (DC) converter 92, an electric distribution system 94, and one or more aircraft systems 96 of the aircraft. The electrical system 90 supplies the electricity from the fuel cell controller 88 to a lubrication system 100 of the turbine engine 10 for powering one or more components of the lubrication system 100, as detailed further below. The electrical system 90 can also supply the electricity to the one or more aircraft systems 96 for powering the one or more aircraft systems 96. The one or more aircraft systems 96 can include, for example, an electrical machine for the turbine engine 10 (e.g., for providing additional power to the power gearbox assembly 46 such that the turbine engine 10 is a hybrid-electric engine), avionic systems, electric pumps (e.g., for controlling flaps), air conditioning, internal lights, external lights, passenger accessories (e.g., video screens, LCD screens, power hookups, or USB hookups, etc., or combinations thereof), an electric motor interconnected to the propulsor or propeller (in situations of a hybrid electric engine), or to other electrical systems of the aircraft, or combinations thereof. The DC converter 92 is a DC/DC converter that is an electronic circuit or an electromechanical device that converts a source of direct current from one voltage level to another voltage level. The DC converter 92 receives the electricity from the fuel cell controller 88 at a first voltage level and converts the electricity to a second voltage level. The electric distribution system 94 receives the electricity at the second voltage level and distributes the electricity to various systems of the turbine engine 10 (e.g., the lubrication system 100) or of the aircraft (e.g., the one or more aircraft systems 96), as detailed further below.

The turbine engine 10 includes the lubrication system 100, including a primary lubrication system 102, an auxiliary lubrication system 104, and a sump 106. The sump 106 (shown schematically in FIG. 2) is a reservoir that collects and stores lubricant therein. In some embodiments, the lubrication system 100 can include one or more tanks or one or more sumps that store the lubricant therein. When more than one sump is used, each of the primary lubrication system 102 and the auxiliary lubrication system 104 may be in fluid communication with different sumps and/or each of the plurality of sumps. Preferably, the lubricant is oil. The lubricant can be any type of lubricant for lubricating the one or more rotating components 55 of the turbine engine 10 (e.g., the plurality of power gearbox gears 49 or the one or more power gearbox bearings 53).

The primary lubrication system 102 includes a primary pump 108 and a primary lubricant supply line 110. The primary pump 108 is in fluid communication with the sump 106 and the primary lubricant supply line 110. The primary lubricant supply line 110 is in fluid communication with the one or more rotating components 55 of the turbine engine 10. The primary pump 108 pumps the lubricant from the sump 106 to the one or more rotating components 55 through the primary lubricant supply line 110 for supplying the lubricant to the one or more rotating components 55, as detailed further below. In some embodiments, the primary pump 108 is a mechanical pump. For example, the primary pump 108 can be coupled to, and powered by, an accessory gearbox assembly (not shown), the LP shaft 36, or the HP shaft 34 such that the respective aforementioned component drives the primary pump 108. In some embodiments, the primary lubrication system 102 supplies the lubricant from the sump 106 to the one or more rotating components 55 without a pump, for example, by gravity or by centrifugal force due to rotation of the planet carrier 51 in the planetary arrangement of the power gearbox gear assembly 47.

The sump 106 is in fluid communication with the one or more rotating components 55 such that the lubricant drains from the one or more rotating components 55 to the sump 106, for example, through a scavenge line (not shown in FIG. 2 for clarity). In some embodiments, the lubrication system 100 includes a sump pump in fluid communication with the primary lubrication system 102 and the auxiliary lubrication system 104. The sump pump pumps the lubricant from the sump 106 to the primary lubrication system 102 or the auxiliary lubrication system 104.

The auxiliary lubrication system 104 includes an auxiliary pump 120, an auxiliary lubricant supply line 122, a motor 124, and an auxiliary pump shaft 126. The auxiliary lubricant supply line 122 is in fluid communication with the sump 106 and the one or more rotating components 55 of the power gearbox assembly 46. While the auxiliary lubricant supply line 122 is depicted as being in fluid communication with the power gearbox assembly 46 in FIG. 2, the auxiliary lubricant supply line 122 can be in fluid communication with any of the one or more rotating components 55 of the turbine engine 10. Further, while the auxiliary lubricant supply line 122 is depicted as a separate flow line as the primary lubricant supply line 110 in FIG. 2, the auxiliary lubricant supply line 122 can form a part of the primary lubricant supply line 110. The auxiliary pump 120 is in fluid communication with the sump 106 and the auxiliary lubricant supply line 122. The auxiliary pump 120 is an electrical pump that is powered by the electricity from the electrical system 90, as detailed further below. The auxiliary pump 120 is drivingly coupled to the motor 124 by the auxiliary pump shaft 126. In this way, the motor 124 drives the auxiliary pump shaft 126 to rotate, thereby causing the auxiliary pump 120 to pump the lubricant from the sump 106 to the one or more rotating components 55 through the auxiliary lubricant supply line 122.

In operation, the LP shaft 36 rotates, as detailed above, and causes the first power gearbox gear 49*a* to rotate. The first power gearbox gear 49*a*, being intermeshed with the one or more second power gearbox gears 49*b*, causes the one or more second power gearbox gears 49*b* to rotate about their corresponding axis of rotation. The one or more second power gearbox gears 49*b* rotate with respect to the one or more power gearbox bearings 53 within the planet carrier 51. When the power gearbox gear assembly 47 is the star arrangement, the one or more second power gearbox gears 49*b*, being intermeshed with the third power gearbox gear 49*c*, cause the third power gearbox gear 49*c* to rotate about the longitudinal centerline axis 12. In such embodiments, the planet carrier 51 remains stationary such that the one or more second power gearbox gears 49*b* do not rotate about the longitudinal centerline axis 12. When the power gearbox gear assembly 47 is the planetary arrangement, the third power gearbox gear 49*c* is stationary in the planet carrier 51, and the one or more second power gearbox gears 49*b*, rotate about the longitudinal centerline axis 12. When the power gearbox gear assembly 47 is the differential gear assembly, both the planet carrier 51 (e.g., the one or more second power gearbox gears 49*b*) and the third power gearbox gear 49*c* rotate about the longitudinal centerline axis 12. In this way, the one or more rotating components 55 rotate.

At the same time, the primary lubrication system 102 supplies the lubricant to the one or more rotating components 55 to lubricate the one or more rotating components 55. During normal operation of the turbine engine 10, the primary pump 108 pumps the lubricant from the sump 106 and to the one or more rotating components 55 through the primary lubricant supply line 110. The primary lubrication system 102 supplies the lubricant to the one or more rotating components 55. The lubricant drains from the one or more rotating components 55 and into the sump 106. During the normal operation of the turbine engine 10, the lubricant in the sump 106 is returned through the primary lubrication system 102 such that the primary lubrication system 102 continuously supplies the lubricant to the one or more rotating components 55. In this way, the lubricant can be re-used to lubricate the one or more rotating components 55.

The auxiliary lubrication system 104 is inactive when the primary lubrication system 102 is active, such as when the turbine engine 10 is operating under normal operation. When the auxiliary lubrication system 104 is inactive, the electrical system 90 does not provide the electricity to the motor 124 such that the motor 124 does not power the auxiliary pump 120. For example, the controller 79 controls the electric distribution system 94 to prevent the electric distribution system 94 from supplying the electricity to the motor 124 during normal operation of the turbine engine 10.

In some instances, the primary lubrication system 102 may be unable to provide the lubricant to the one or more rotating components 55. For example, the primary lubrication system 102 may be unable to pressurize the lubricant to supply the lubricant to the one or more rotating components 55 during windmilling, while the turbine engine 10 is shut down, or during a failure of the turbine engine 10 or failure of the primary lubrication system 102 (e.g., the primary pump 108) while in-flight. This may be due to the primary pump 108 being driven by a component of the turbine engine 10. In such instances, the windmilling may cause the shafts (e.g., the propulsor shaft 45, the HP shaft 34, and the LP shaft 36) of the turbine engine 10 to rotate, thereby causing the one or more rotating components 55 to continue to rotate. As mentioned above, the one or more rotating components 55 (e.g., the plurality of power gearbox gears 49 or the one or more power gearbox bearings 53) can become damaged if there is not enough lubricant supplied to the one or more rotating components 55.

Accordingly, during such instances, the auxiliary lubrication system 104 activates to supply the lubricant to the one or more rotating components 55. For example, the controller 79 (FIG. 1) controls the electric distribution system 94 to supply the electricity to the motor 124. In such instances, the fuel system 80 generates the electricity (e.g., with the fuel cell controller 88) and the electricity is supplied to the motor 124 when the turbine engine 10 is shut down and when the propulsor 38 is windmilling. In this way, the motor 124 is powered by the electricity from the electrical system 90 that is generated by the fuel cell controller 88 as the electricity is continuously being generated by the fuel system 80 even when the turbine engine 10 is shut down. The motor 124 rotates the auxiliary pump shaft 126, thereby causing the auxiliary pump 120 to pump the lubricant from the sump 106 to the one or more rotating components 55 through the auxiliary lubricant supply line 122. The lubricant drains from the one or more rotating components 55 and into the sump 106. While the auxiliary lubrication system 104 is active, the lubricant in the sump 106 is returned through the auxiliary lubrication system 104 such that the auxiliary lubrication system 104 continuously supplies the lubricant to the one or more rotating components 55 while the electricity is being supplied to the auxiliary pump 120.

The controller 79 activates the auxiliary lubrication system 104 based on at least one of a pressure of the lubricant in the primary lubrication system 102 (e.g., in the primary lubricant supply line 110) or a rotational speed of at least one of the HP shaft 34, the LP shaft 36, or the propulsor shaft 45. For example, the controller 79 activates the auxiliary lubrication system 104 when the pressure of the lubricant in the primary lubrication system 102 is less than a primary pressure threshold. In some embodiments, the controller 79 activates the auxiliary lubrication system 104 when the rotational speed of the at least one of the HP shaft 34, the LP shaft 36, or the propulsor shaft 45 is less than a rotational speed threshold.

Accordingly, the auxiliary lubrication system 104 supplies the lubricant to the one or more rotating components 55 while the turbine engine 10 is shut down or is otherwise windmilling. The fuel cell controller 88, the electrical system 90, and the motor 124 ensure that the auxiliary pump 120 operates to pump the lubricant to the one or more rotating components 55 even when the turbine engine 10 is shut down and independently of the rotational direction of the propulsor 38 during windmilling (e.g., whether the propulsor is rotating clockwise or counterclockwise).

Further aspects of the present disclosure are provided by the subject matter of the following clauses.

A lubrication system for a turbine engine, the turbine engine including a propulsor and one or more rotating components, the lubrication system comprising a sump that stores lubricant therein, a primary lubrication system supplying the lubricant from the sump to the one or more rotating components during normal operation of the turbine engine, an auxiliary lubrication system comprising an auxiliary pump, and a fuel system that stores hydrogen fuel, the fuel system comprising a fuel cell controller that generates electricity from the hydrogen fuel, the electricity powering the auxiliary pump when the propulsor is windmilling such that the auxiliary pump pumps the lubricant from the sump to the one or more rotating components.

The lubrication system of the preceding clause, the auxiliary lubrication system comprising an auxiliary lubricant supply line in fluid communication with the sump and the one or more rotating components, and the lubricant flows from the sump to the one or more rotating components through the auxiliary lubricant supply line when the propulsor is windmilling.

The lubrication system of any preceding clause, the primary lubrication system comprising a primary pump and a primary lubricant supply line in fluid communication with the sump and the one or more rotating components, and the primary pump pumps the lubricant from the sump to the one or more rotating components through the primary lubricant supply line during the normal operation of the turbine engine.

The lubrication system of any preceding clause, the fuel system comprising a fuel tank that stores liquid hydrogen fuel, a fuel pump, and a vaporizer, the fuel pump pumps the liquid hydrogen fuel to the vaporizer, and the vaporizer heats the liquid hydrogen fuel to generate gaseous hydrogen fuel, the gaseous hydrogen fuel being supplied to the fuel cell controller to generate the electricity.

The lubrication system of any preceding clause, the fuel cell controller being prevented from supplying the electricity to the auxiliary pump during the normal operation of the turbine engine.

The lubrication system of any preceding clause, the auxiliary pump including a motor that is powered by the electricity, the motor powering the auxiliary pump.

The lubrication system of any preceding clause, the auxiliary pump including an auxiliary pump shaft coupled to the motor, and the motor causes the auxiliary pump shaft to rotate to power the auxiliary pump.

The lubrication system of any preceding clause, further comprising an electrical system that receives the electricity from the fuel cell controller and supplies the electricity to the auxiliary pump.

The lubrication system of any preceding clause, the electrical system comprising a direct current converter that changes a voltage of the electricity from the fuel cell controller.

The lubrication system of any preceding clause, the electrical system comprising an electric distribution system in communication with the auxiliary pump, the electric distribution system supplying the electricity from the fuel cell controller to the auxiliary pump.

The lubrication system of any preceding clause, the turbine engine comprising a power gearbox assembly having a plurality of power gearbox gears.

The lubrication system of any preceding clause, the one or more rotating components being one or more power gearbox bearings of the power gearbox assembly.

The lubrication system of any preceding clause, the one or more power gearbox bearings being journal bearings.

The lubrication system of any preceding clause, the electrical system further supplying the electricity to one or more aircraft systems.

The lubrication system of any preceding clause, the propulsor being a fan.

The lubrication system of any preceding clause, the propulsor being a propeller.

A method of operating the lubrication system of any preceding clause, the method comprising supplying the lubricant through the primary lubrication system to the one or more rotating components during normal operation of the turbine engine, generating, with the fuel cell controller, the electricity from the hydrogen fuel, and pumping, with the auxiliary pump, the lubricant from the sump to the one or more rotating components by powering the auxiliary pump with the electricity when the propulsor is windmilling.

The method of any preceding clause, the auxiliary lubrication system comprising an auxiliary lubricant supply line in fluid communication with the sump and the one or more rotating components, and the method further comprises directing the lubricant from the sump to the one or more rotating components through the auxiliary lubricant supply line when the propulsor is windmilling.

The method of any preceding clause, the primary lubrication system comprising a primary pump and a primary lubricant supply line in fluid communication with the sump and the one or more rotating components, and the method further comprises pumping, with the primary pump, the lubricant from the sump to the one or more rotating components through the primary lubricant supply line during the normal operation of the turbine engine.

The method of any preceding clause, the fuel system comprising a fuel tank that stores liquid hydrogen fuel, a fuel pump, and a vaporizer, and the method further comprises pumping, with the fuel pump, the liquid hydrogen fuel to the vaporizer, heating, with the vaporizer, the liquid hydrogen fuel to generate gaseous hydrogen fuel, and generating, with the fuel cell controller, the electricity with the gaseous hydrogen fuel.

The method of any preceding clause, further comprising preventing the fuel cell controller from supplying the electricity to the auxiliary pump during the normal operation of the turbine engine.

The method of any preceding clause, the auxiliary pump including a motor that is powered by the electricity, and the method further comprises powering the auxiliary pump with the motor.

The method of any preceding clause, the auxiliary pump including an auxiliary pump shaft coupled to the motor, and the method further comprises causing, with the motor, the auxiliary pump shaft to rotate to power the auxiliary pump.

The method of any preceding clause, the lubrication system further comprising an electrical system, and the method further comprises receiving, with the electrical system, the electricity from the fuel cell controller, and supplying, with the electrical system, the electricity to the auxiliary pump.

The method of any preceding clause, the electrical system comprising a direct current converter, and the method further comprises changing a voltage of the electricity from the fuel cell controller with the direct current converter.

The method of any preceding clause, the electrical system comprising an electric distribution system in communication with the auxiliary pump, and the method further comprises supplying the electricity from the fuel cell controller to the auxiliary pump with the electric distribution system.

The method of any preceding clause, the lubrication system being the lubrication system of any preceding clause.

A turbine engine comprising a propulsor and a core turbine engine having a shaft, the propulsor being drivingly coupled to the shaft. The turbine engine comprises the lubrication system of any preceding clause.

The turbine engine of the preceding clause, the propulsor being a fan.

The turbine engine of any preceding clause, the propulsor being a propeller.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A lubrication system for a turbine engine, the turbine engine including a propulsor, one or more rotating components, and a controller, the lubrication system comprising:
   a sump that stores lubricant therein;
   a primary lubrication system supplying the lubricant from the sump to the one or more rotating components during normal operation of the turbine engine;
   an auxiliary lubrication system comprising an auxiliary pump;
   a fuel system that stores hydrogen fuel, the fuel system comprising a fuel cell controller that generates electricity from the hydrogen fuel; and
   an electrical system comprising an electric distribution system configured to receive the electricity from the fuel cell controller and to supply the electricity to the auxiliary pump such that the auxiliary pump pumps lubricant from the sump to one or more rotating components, wherein the electric distribution system is controlled by the controller to supply the electricity to the auxiliary pump only when the propulsor is windmilling.

2. The lubrication system of claim 1, wherein the auxiliary lubrication system comprises an auxiliary lubricant supply line in fluid communication with the sump and the one or more rotating components, and the lubricant flows from the sump to the one or more rotating components through the auxiliary lubricant supply line when the propulsor is windmilling.

3. The lubrication system of claim 1, wherein the primary lubrication system comprises a primary pump and a primary lubricant supply line in fluid communication with the sump and the one or more rotating components, and the primary pump pumps the lubricant from the sump to the one or more rotating components through the primary lubricant supply line during the normal operation of the turbine engine.

4. The lubrication system of claim 1, wherein the fuel system comprises a fuel tank that stores liquid hydrogen fuel, a fuel pump, and a vaporizer, the fuel pump pumps the liquid hydrogen fuel to the vaporizer, and the vaporizer heats the liquid hydrogen fuel to generate gaseous hydrogen fuel, the gaseous hydrogen fuel being supplied to the fuel cell controller to generate the electricity.

5. The lubrication system of claim 1, wherein the fuel cell controller is prevented from supplying the electricity to the auxiliary pump during the normal operation of the turbine engine.

6. The lubrication system of claim 1, wherein the auxiliary pump includes a motor that is powered by the electricity, the motor powering the auxiliary pump.

7. The lubrication system of claim 6, wherein the auxiliary pump includes an auxiliary pump shaft coupled to the motor, and the motor causes the auxiliary pump shaft to rotate to power the auxiliary pump.

8. The lubrication system of claim 1, wherein the electrical system comprises a direct current converter that changes a voltage of the electricity from the fuel cell controller.

9. The lubrication system of claim 1, the turbine engine comprising a power gearbox assembly having a plurality of power gearbox gears.

10. The lubrication system of claim 1, the propulsor being a fan.

11. The lubrication system of claim 1, the one or more rotating components being one or more power gearbox bearings of the power gearbox assembly.

12. The lubrication system of claim 11, the one or more power gearbox bearings being journal bearings.

13. A method of operating a lubrication system for a turbine engine that includes a propulsor, the method comprising:
   supplying lubricant through a primary lubrication system from a sump to one or more rotating components of the turbine engine during normal operation of the turbine engine;
   generating, with a fuel cell controller, electricity from hydrogen fuel;
   pumping, with an auxiliary pump of an auxiliary lubrication system, the lubricant from the sump to the one or more rotating components;
   receiving, with an electrical system comprising an electric distribution system, the electricity from the fuel cell controller;
   supplying, with the electric distribution system, the electricity to the auxiliary pump; and
   controlling, with a controller, the supply of electricity from the electric distribution system to the auxiliary pump only when the propulsor is windmilling.

14. The method of claim 13, wherein the auxiliary lubrication system comprises an auxiliary lubricant supply line in fluid communication with the sump and the one or more rotating components, and the method further comprises directing the lubricant from the sump to the one or more rotating components through the auxiliary lubricant supply line when the propulsor is windmilling.

15. The method of claim 13, wherein the primary lubrication system comprises a primary pump and a primary lubricant supply line in fluid communication with the sump and the one or more rotating components, and the method further comprises pumping, with the primary pump, the lubricant from the sump to the one or more rotating components through the primary lubricant supply line during the normal operation of the turbine engine.

16. The method of claim 13, wherein a fuel system comprises the fuel cell controller and a fuel tank that stores liquid hydrogen fuel, a fuel pump, and a vaporizer, and the method further comprises:
   pumping, with the fuel pump, the liquid hydrogen fuel to the vaporizer;

heating, with the vaporizer, the liquid hydrogen fuel to generate gaseous hydrogen fuel; and generating, with the fuel cell controller, the electricity with the gaseous hydrogen fuel.

17. The method of claim 13, further comprising the controller preventing the fuel cell controller from supplying the electricity to the auxiliary pump during the normal operation of the turbine engine.

18. The method of claim 13, wherein the auxiliary pump includes a motor that is powered by the electricity, and the method further comprises powering the auxiliary pump with the motor.

19. The method of claim 18, wherein the auxiliary pump includes an auxiliary pump shaft coupled to the motor, and the method further comprises causing, with the motor, the auxiliary pump shaft to rotate to power the auxiliary pump.

20. The method of claim 13, wherein the electrical system comprises a direct current converter, and the method further comprises changing a voltage of the electricity from the fuel cell controller with the direct current converter.

* * * * *